United States Patent [19]
Drieux

[11] Patent Number: 5,849,120
[45] Date of Patent: Dec. 15, 1998

[54] DEVICE FOR MONITORING THE INFLATION PRESSURE OF THE TIRES OF A VEHICLE

[75] Inventor: Jean-Jacques Drieux, Volvic, France

[73] Assignee: Compagnie Generale des Etablissements Michelin - Michelin & Cie, Clermont-Ferrand Cedex, France

[21] Appl. No.: 790,157

[22] Filed: Jan. 28, 1997

[30] Foreign Application Priority Data

Feb. 1, 1996 [FR] France .................................. 96 01339

[51] Int. Cl.⁶ ................................................... B60C 23/00
[52] U.S. Cl. ........................ 152/416; 73/146.2; 340/444
[58] Field of Search .......................... 340/444; 73/146.2; 152/415, 416

[56] References Cited

U.S. PATENT DOCUMENTS 4,149,140  4/1979  Evans et al. ............................. 340/444
5,327,346  7/1994  Goodell ................................ 152/416 X

FOREIGN PATENT DOCUMENTS 0389406   9/1990   European Pat. Off. .
2200126   4/1974   France .
2341423   2/1975   Germany .
92/12474  10/1990  WIPO .

Primary Examiner—Francis J. Lorin

[57] ABSTRACT

An arrangement for monitoring the under-inflation of one of the tires of a vehicle comprising a chassis and at least one axle having two wheels equipped with tires, based on an analysis of the differences in position of the wheels relative to the chassis, characterized by the fact that the measurement of the differences in position of the wheels on the same axle relative to the chassis is effected by means of an element of generally U-shape, the central portion of which has a fixed position relative to the chassis of the vehicle, and each of the ends of which are connected to one of the wheel holders of the wheels of the axle in such a manner that any difference in position between the two wheels relative to the chassis of the vehicle results in a twisting of said element.

13 Claims, 5 Drawing Sheets

DEVICE FOR MONITORING THE INFLATION PRESSURE OF THE TIRES OF A VEHICLE

SPECIFICATION

BACKGROUND OF THE INVENTION

The present invention relates to an arrangement for monitoring the under-inflation of one of the tires of a vehicle based on an analysis of the differences in position of the wheel centers relative to the chassis of the vehicle. It also has as its object a centralized inflation system which includes said arrangement.

For the safety in use of automotive vehicles, it is particularly important to comply with the inflation pressures recommended for each of the tires of the vehicle. An improper inflation pressure may also result in an increase in the consumption of fuel and a decrease in the life of the tire, or even its final destruction. The use of tubeless tires makes the continuous monitoring of the inflation pressures all the more necessary since such tires generally deflate only very slowly in the case of a puncture. The result is that the driver may drive his vehicle with an under-inflated tire for a rather long period of time before noting the puncture.

Numerous pressure-monitoring devices based on direct measurement of the inflation pressure have been made known. By way of example, U.S. Pat. No. 4,703,650 discloses a coding device which can be used for transmitting pressure and temperature measurements from the wheel to the vehicle. U.S. Pat. No. 5,285,189 concerns a device which transmits pressure measurements by radio to a central unit. However, these devices have not yet enjoyed wide use due to their excessive cost in the first case and problems of reliability in the second case, in particular due to the necessity of using batteries in order to feed the pressure detectors.

Other devices employing indirect measurements of the inflation pressure have also been suggested. Among them, numerous patents, such as FR 2,568,519, are based on an analysis of the variations in the radius of roll of the tires as a function of their inflation pressure. Despite numerous efforts, this technique also has not enjoyed a wide acceptance due to the lack of sensitivity of the method, as a result, in particular, of the fact that the laws governing the development of the radius of roll vary as a function of the tires in question, and the same radius of roll can sometimes be observed with two different pressures.

Among other indirect methods, U.S. Pat. No. 2,499,669 makes use of the fact that the deflation of one of the tires of an axle results in a movement of said tire relative to the chassis of the vehicle accompanied by an inclination of the axle. Said patent thus discloses a device for measuring the pressure of tires of a vehicle based on the detection of an abnormal distance of one of the wheel centers of the tires relative to the chassis of the vehicle. However, this device proposes an independent detection for each tire and in order to avoid excessive false alarms, the threshold of detection must be selected much too low to be able to be really effective.

U.S. Pat. No. 3,900,828 discloses an under-inflation alarm device for one of the tires of the landing gear of a airplane employing the same principle, but with a compensation between the four tires of two axles. Each bogie, which comprises two axles rigidly connected by a central shaft and four wheels, is monitored independently. Deformation gauge detectors placed on the axles on opposite side of the central axis measure the load borne by each wheel. The signals for each truck are added diagonally. An alarm is given when a difference between the diagonal signals is greater than a given threshold. However, the lack of sensitivity of these devices has caused numerous false alarms which it has not been possible to control completely by a more complex processing of the signals obtained (U.S. Pat. No. 4,450,385) and these devices have been abandoned in favor of a method of monitoring based on direct measurement of the inflation pressures (U.S. Pat. No. 4,283,707).

There is therefore still a need, for passenger and heavy vehicles, of a device for detecting the under-inflation of the tires which is based on an indirect measurement which is of great sensitivity and of sufficiently low cost to be capable of being developed in large series.

SUMMARY OF THE INVENTION

In the following, there is understood by "wheel holder" the parts which actually support the wheels without other decoupling than the rolling rotations of said wheels, as well as suspension parts directly connected to the above-mentioned parts and the displacements of which are similar. By "axle" there is understood the assembly of parts located transversely below the chassis of a vehicle and supporting its weight. Each axle comprises at least two wheels and their wheel holders.

The object of the present invention is an under-inflation detection device which can be used on all vehicles whether they are provided with independent suspension or rigid axles. This device is particularly simple, inexpensive, and of great sensitivity.

In accordance with the invention, a device for making known the under-inflation of one of the tires of a vehicle comprising a chassis and at least one axle having two wheels equipped with tires, based on an analysis of the differences in position of the wheels relative to the chassis, is characterized by the fact that the measurement of the difference in position of the wheels of one and the same axle relative to the chassis is effected by means of an element of generally U-shape the central portion of which has a fixed position relative to the chassis of the vehicle and each of the ends of which are connected to one of the wheel holders of the wheels of the axle so that any difference in position between the two wheels relative to the chassis of the vehicle results in a twisting of said element.

The measurement means thus defined is sensitive only to variations in the position of the wheels relative to the chassis and it thus presents remarkable sensitivity to any difference in relative position of the wheels, whatever the load borne by the axle.

This arrangement can be employed on all vehicles in which the deflation of one of the tires results in its movement relative to the chassis.

Of course, this arrangement is particularly effective in the case of vehicles equipped with at least two axles, since in such case the average position of the chassis relative to the ground varies only very slightly as a function of the inflation pressure of one of the tires, which explains why the average relative distance between the wheel of said tire and the chassis varies very greatly.

In the case of a vehicle equipped with at least two axles, it is advantageous to combine, between at least two axles, the measured differences in order to eliminate the consequences of rolling of the vehicle.

This combination can advantageously take into account variations in rigidity of the suspensions between the axles.

The device in accordance with the invention advantageously also uses, when they are present, the antiroll bars of the suspensions of the vehicles. This device therefore attributes an additional function to these antiroll bars.

The torsion-measurement detector can be included in a sleeve which can be fastened on the antiroll bar. This makes it possible to market devices which can easily be attached to all vehicles equipped with an antiroll bars while guaranteeing excellent quality of the measurement effected by the detector.

Another object of the invention is a centralized inflation system for the tires of a vehicle comprising means for measuring and modifying the inflation pressure of each tire, associated with an alarm device indicating under-inflation, such as previously described.

DESCRIPTION OF THE DRAWINGS

The invention is explained by the following figures and description, given solely by way of example.

DESCRIPTION OF PREFERRED EMBODIMENTS

Figure 1:
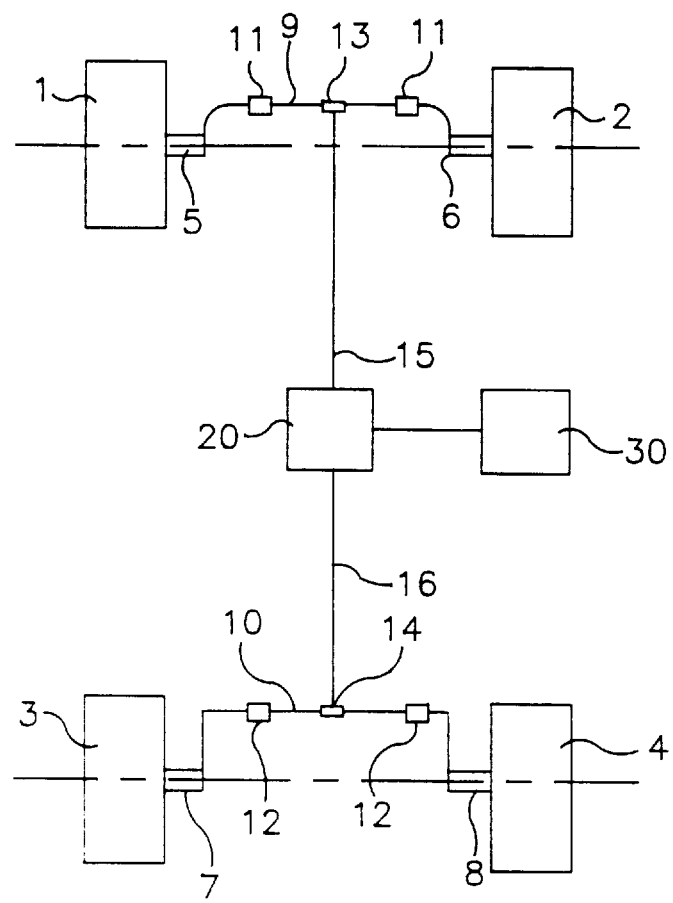
FIG. 1 is a diagrammatic view of a vehicle equipped with a device in accordance with the invention.

FIG. 1 shows diagrammatically the use of a device in accordance with the invention on a vehicle the two axles of which, front and rear, are equipped with antiroll bars.

In this figure there are shown wheels 1, 2, 3, 4, wheel holders 5, 6, 7, 8, and the two antiroll bars 9, 10 of the front axle and of the rear axle. These antiroll bars 9, 10 are attached to the chassis of the vehicle by bearings 11 and 12, and their ends are fastened to the wheel holders 5, 6, 7, 8. Therefore, any difference in position between the two wheels of one and the same axle relative to the chassis will result in the twisting of the antiroll bar. This bar therefore limits the rolling of the chassis, hence its name antiroll bar.

Figure 2:
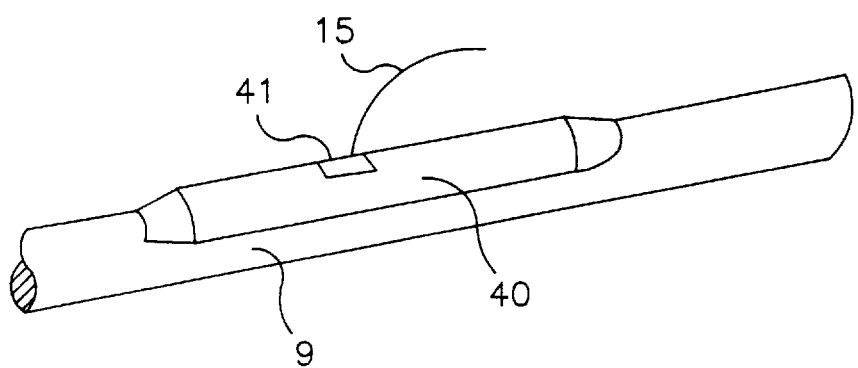
FIG. 2 shows a manner of fastening a measurement detector on an antiroll bar.

Each antiroll bar 9, 10 is equipped with a detector 13, 14 for the measurement of its twist. This detector may be a stress gauge bridge for example. This gauge bridge 41 (FIG. 2) can be directly applied on the surface of the antiroll bar. However, particularly in the event that a detection device in accordance with the invention is installed on a vehicle which has not yet been equipped, it is desirable to place these gauges 41 in a sleeve 40 which in its turn is attached to the surface of the antiroll bar 9. This makes it possible better to control the conditions for placing the measurement detector and thus to improve the quality and reliability of the measurement.

The measurement signals are transmitted to a central unit 20 over the lines 15 and 16. The central unit is connected to an alarm 30.

Figure 3:
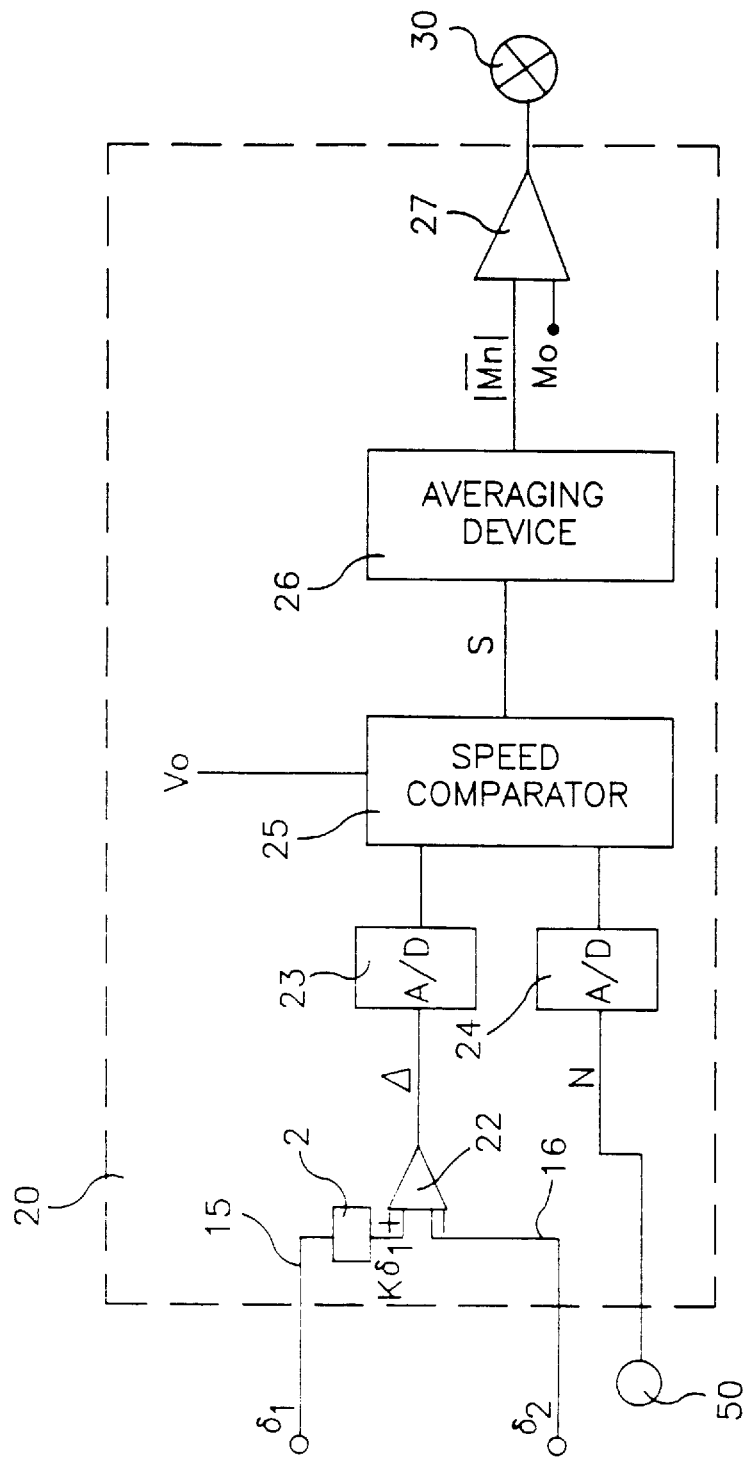
FIG. 3 shows a diagram of one embodiment of the invention.

FIG. 3 shows an embodiment of the device. After having been detected and amplified, the signals $\delta_1$ and $\delta_2$ coming from the detectors 13 and 14 are conducted by the lines 15 and 16 to the central unit 20. The signal $\delta_1$ transformed into $K\delta_1$ by the multiplier 21. The coefficient K serves to take into account possible differences in rigidity between the tensions of the front and rear axles of the vehicle. It is adjusted in such a manner that, for identical roll, the measurement signals $K\delta_1$ and $\delta_2$ are identical. One can easily determine this parameter K experimentally, for instance by imposing a given roll (that is to say a given angle of rotation of the chassis relative to a longitudinal axis) on the chassis of the vehicle by means of an ordinary jack. Of course, this determination must be made when the vehicle has all its tires properly inflated.

The comparator 22 subtracts the signals $K\delta_1$ and $\delta_2$ in order to obtain the signal:

$$\Delta = K\delta_1 - \delta_2.$$

This signal is digitized by the convertor 23 with a sampling frequency f.

The central unit preferably also receives a signal v coming from the tachometer 50 of the vehicle indicating the speed of the vehicle. This signal v is digitized by the convertor 24 with the same sampling frequency, and the element 25 effects a comparison of the value of the speed of the vehicle v relative to a reference value $V_0$ in order to inhibit under-inflation detection measurement when the speed is less than $V_0$. The signal coming from the element 25 is S, with:

S=$\Delta$ if v is greater than or equal to $V_0$, and

S=0 if v is less than $V_0$.

The element 26 effects a sliding average over n points of S. For this, it maintains in memory the last n values of S and calculates the average $\overline{M}_n$ thereof.

The comparator 27 tests the absolute value of $\overline{M}_n$ relative to a threshold $M_0$ and transmits an alarm to the lamp 30 as soon as the absolute value of $\overline{M}_n$ exceeds the threshold $M_0$.

The operation of the device is as follows. When the vehicle is placed on a flat surface with a balanced left-right load for each axle, the relative positions of the wheels relative to the chassis are substantially identical. The twist in the antiroll bars is zero and the signals $\delta_{front}$ and $\delta_{rear}$, and therefore their difference, are also zero. Upon travel, as a result of unevennesses in the pavement or movements of the chassis due to turns, the relative positions of the two wheels of the same axle relative to the chassis are no longer identical in instantaneous values and the signals $\delta_{front}$ and $\delta_{rear}$ resulting in a difference $\Delta$. On the other hand, the average values of these signals $\delta_{front}$ and $\delta_{rear}$ remain close to zero, except when the rolling of the vehicle is substantial, that is to say, the inclination of the vehicle relative to the two front and rear axles is substantial.

In this case, when the signals $\delta_{front}$ and $\delta_{rear}$ have a value close to each other due to the rolling of the vehicle, the compensation proposed makes it possible to eliminate this imbalance by the calculation of $\Delta$. The use of the factor K substantially improves the reliability of the measurement.

In conclusion, it is only when the inflation pressure of the tire decreases that the average value of the signal $\Delta$, $\overline{M}_n$, differs substantially from zero.

A PEUGEOT 405 SRI car had been equipped with gauge bridges on its two antiroll bars. The signal of each bridge had been adjusted in such a manner that for the two axles, front and rear, a difference in relative position between the chassis and the left and right wheel holders of 2 mm corresponds to a signal of 0.1 volt. The corresponding factor K is on the order of 1.1 to 1.2.

The signals coming from the gauge bridges had been sampled with a sampling frequency of 1 Hz. They had been analyzed by calculating a sliding average over 60 points, or also 60 seconds. The measurements carried out with a speed of travel of less than 5 km/hr had not been taken into account.

Figure 4:
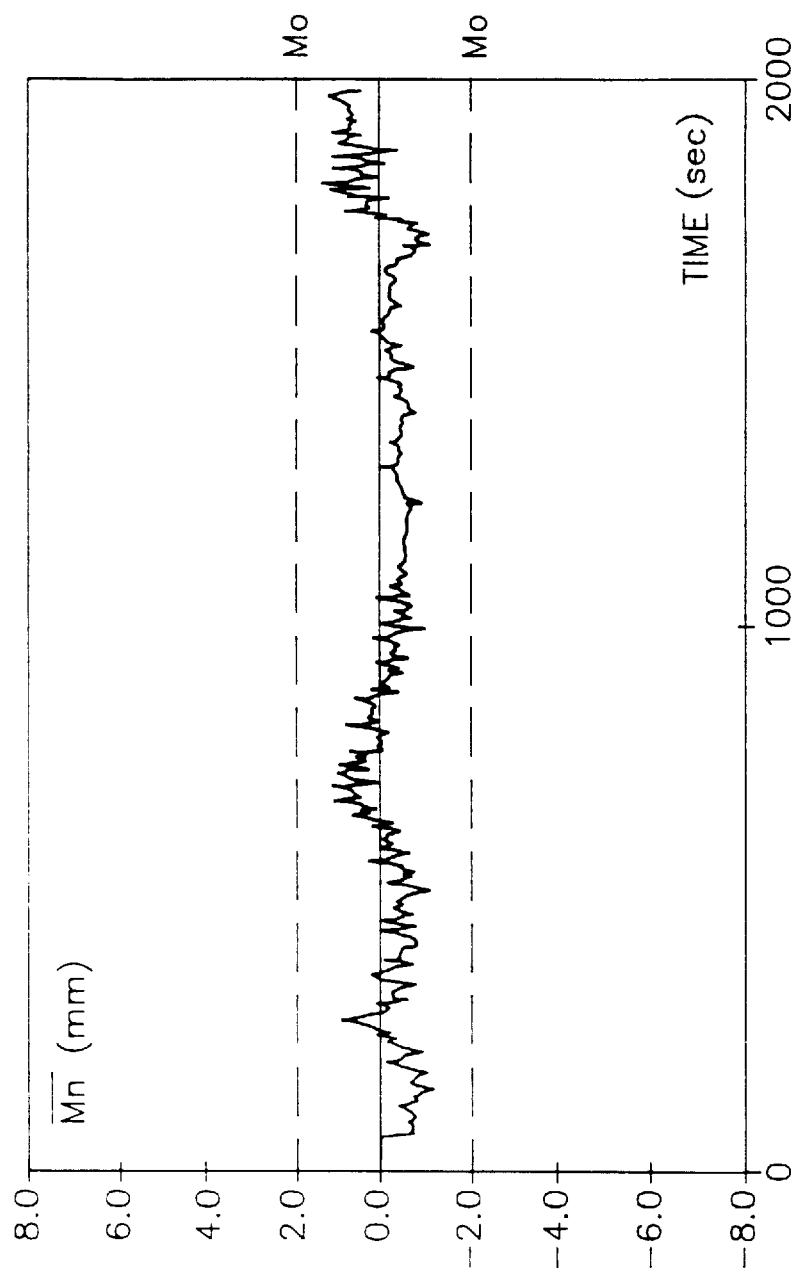
FIG. 4 is a record of the signals obtained upon travel.
Figure 5:
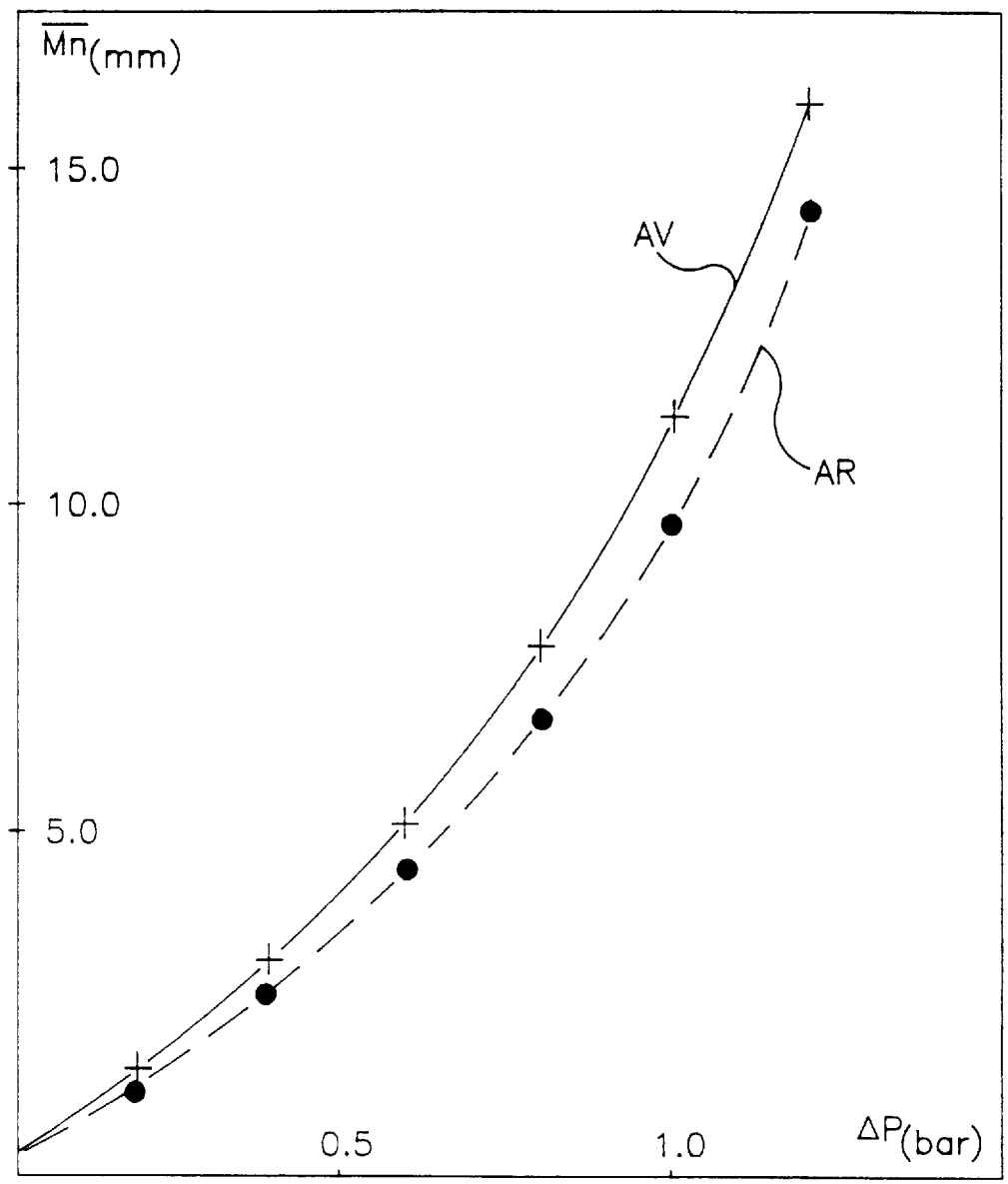
FIG. 5 shows the change in the relative difference in position upon the decrease of the inflation pressure of one of the tires of the vehicle.

FIG. 4 shows the change of the sliding average $\overline{M}_n$ during travel while the four tires of the vehicle are inflated normally to a pressure cold of 2.0 bars. The speeds, road surfaces and circuits during this test varied greatly. This graph indicates that the average value of the differences is always within ±0.05 volt which corresponds to ±1 mm difference in relative position. The noise of the signal is therefore, under the conditions of the test, ±1 mm difference in relative position of one of the tires with respect to the three others. Under these conditions, a variation of the signal of more than ±0.1 volt, namely a difference in relative position of more than ±2 mm, definitely corresponds to a problem with the inflation of one of the tires.

The graph 5 shows the change of the average value of the signal $\overline{M}_n$ when the inflation pressure of one of the tires, left front or left rear, has gradually decreased. A detection threshold of 0.1 volt or 2 mm difference in relative position corresponds substantially to a decrease of 0.25 bar in front and 0.3 bar in the rear. In fact, for a given difference in position, the correspondence in pressure is a function of the tire and of the rigidities of the suspension of the axle in question. It should be noted, and this is a major advantage of this method of detection that the sensitivity of the device increases with the decrease in pressure. The change in the average difference with the pressure is greater the lower the pressure is. This variation law is unequivocal.

This device thus permits a simple and particularly fine detection of the under-inflation of one of the tires of the vehicle. It is desirable, in order to obtain a good robustness of the system, to neutralize the measurements carried out at a low speed of travel, since in that case problems of friction of the antiroll bars in their bearings or problems of parking with a wheel too offset relative to the chassis as compared with the other may give rise to false alarms.

This device may advantageously be equipped with a device for the resetting to zero of the acquisition chain in order to take into account the legal possibility of having on the same axle tires with depths of tread other than 5 mm. It is not necessary that the system detect differences in wear which remain legal. By making a resetting to zero possible after each intervention on the tires, such as readjustment of the inflation pressures or change, the maximum sensitivity of the system can be utilized.

The example of determination shown favors the detection of relatively slow deflations with an integration time of 60 seconds. This makes it possible to have very good precision of detection. Of course, it may be advantageous to effect this determination with two or more different integration times in order to be able to take into account the very different kinetics of deflation actually observed in practice. One can also sample the measurements as a function of the distance traversed by the vehicle instead of the time.

This device can easily be applied to all vehicles equipped with antiroll bars having rigid axles or independent suspensions. Vehicles which do not have such bars can be equipped with false antiroll bars the sole function of which will be to measure the difference in position between the left and right wheels of the axle relative to the chassis.

The very great sensitivity of the device also permits its application in the case of vehicles equipped with twin wheels. The twin wheels are then considered a single wheel for the carrying out thereof.

In the case of passenger cars, it is noted that K is substantially a constant. On the other hand, in the case of heavy-load vehicles, the stiffness of the suspensions varies greatly with the load borne by each axle, and therefore K becomes a function of the loads borne by the two axles in question. This function may, as previously, be determined by experiment.

The method of calculating the function $\Delta$ applies also in the event that there are detectors which indicate the position of each wheel relative to the chassis. The detection of under-inflation therefore consists in:

measuring for each axle i, the positions $d_{i1}$ and $d_{i2}$ of each wheel relative to the chassis and calculating $\delta_i = d_{i1} - d_{i2}$;

calculating for each pair of axles i and j, the relationship $\Delta_{ij} = K\delta_i - \delta_j$, in which K is a characteristic function of the axles i and j of the vehicle;

giving an alarm when $\Delta_{ij}$ satisfies a given relationship.

Association between a device in accordance with the invention and a centralized inflation system is particularly advantageous.

Centralized inflation systems comprise a source or reserve of compressed air installed on board the vehicle, such as a compressor, conduits connecting such source to the tires via rotating joints, and a selector which makes it possible to connect the source to each of the tires; French Patent 884,598 and European Patent 297,837 may be cited. The customary manner of operation of these systems consists in periodically measuring the pressure of each tire and correcting it, if necessary, by inflation or deflation of the tire in question.

These centralized inflation devices for the pressure of the tires of a vehicle have only met with very limited use up to now due to the fact that their continuous or quasi-continuous operation is indispensable for their effectiveness. In particular, the parts, especially the rotating joints and the compressors, of these devices must be very amply dimensioned in order to be able to withstand this constant use, resulting in problems of cost of production and of operation (resistance to advance) which are prohibitive for wide use.

The association between a detector in accordance with the invention and a centralized inflation system makes it possible to obtain a system of reduced cost of production and operation.

In fact, such a system can have its operation optimized in the following manner:

upon each start, verification and readjustment of the pressure of each tire by means of the centralized inflation and pressure monitoring system;

after this verification, stopping of the centralized inflation system and monitoring system of the pressure of the tires with the device based on the measurement of the differences in relative position of the wheel holders with respect to the chassis;

in case of an alarm, reactivation of the centralized pressure monitoring system.

One can also advantageously provide a device for the resetting to zero of the detection device based on the measurement of the differences in relative position of the wheel holders with respect to the chassis upon each start after having verified and readjusted the pressures if necessary. This resetting to zero is preferably effected before the stopping of the centralized pressure monitoring and modification means.

In this way, the centralized inflation and monitoring system operates only once upon each start of the vehicle, which considerably decreases the requirements as to resistance to fatigue which it must satisfy and thus permits a very substantial decrease in its cost of production and operation.

I claim:

1. A device indicating the under-inflation of one of the tires of a vehicle having a chassis and at least one axle with two wheels equipped with tires, based on an analysis of the differences in position of the wheels relative to the chassis, characterized by the fact that the measurement of the differences in position of the wheels of one and the same axle relative to the chassis is effected by means of an element of generally U-shape the central portion of which has a fixed position relative to the chassis of the vehicle and each of the ends of which are connected to one of the wheel holders of the wheels of the axle so that any difference in position between the two wheels relative to the chassis of the vehicle results in a twisting of said element.

2. A device according to claim 1, comprising means for combining, between the axles, the differences measured and means for analyzing the result of the combining and for triggering an alarm when this result satisfies a given relationship.

3. A device according to claim 2 in which, for two axles i and j the measured signals of which are $\delta_i$ and $\delta_j$, the combination means calculate the relationship $\Delta_{ij}=K\delta_i-\delta_j$, in which K is a function characteristic of the axles i and j of the vehicle.

4. A device according to claim 3, in which K is a function of the loads borne by the axles i and j.

5. A device according to claim 3, in which K is a constant.

6. A device according to claim 1, in which said U-shaped element is an antiroll bar of the suspension of the vehicle.

7. A device according to claim 1, in which said U-shaped element comprises a detector for the measurement of the twist of said element, contained within a sleeve which can be fastened on said element.

8. A centralized inflation system for the tires of a vehicle, comprising means for measuring and modifying the inflation pressure of each tire, characterized by the fact that it comprises an arrangement which gives notice of under-inflation of one of the tires according to claim 1.

9. A method of monitoring the pressure of the tires of a vehicle equipped with centralized means for measuring and modifying the inflation pressure of each tire by a monitoring device according to claim 1, such that:

upon each start, the tire pressure of each tire is verified and readjusted as necessary by said centralized pressure measurement and modification means;

after this verification, the operation of the centralized pressure measurement and modification means is stopped and the inflation pressure the tires is monitored by the monitoring device;

in case of an alarm, the centralized pressure measurement and modification means are placed back in operation.

10. A method according to claim 9, such that, after each start and verification of the inflation pressure of each tire by the centralized pressure measurement and modification means, and before they are stopped, the monitoring device is reset to zero.

11. A method of detecting the under-inflation of one of the tires of a vehicle comprising a chassis and at least two axles having two wheels equipped with tires, in which:

for each axle i, the positions $d_{i1}$ and $d_{i2}$ of each wheel relative to the chassis are measured and $\delta_i=d_{i1}-d_{i2}$ is calculated;

for each pair of axles i and j, the relationship $\Delta_{ij}=K\delta_i-\delta_j$, in which K is a characteristic function of the axles i and j of the vehicle, is calculated;

an alarm is given when $\Delta_{ij}$ satisfies a given relationship.

12. A method according to claim 11, in which K is a function of the loads borne by the axles i and j.

13. A method according to claim 12, in which K is a constant.

* * * * *